Patented Dec. 12, 1944

2,364,828

UNITED STATES PATENT OFFICE 2,364,828

CLINKERING COAL AND METHOD OF PRODUCING SAME

Edward Swartzman, Ottawa, Ontario, Canada, assignor to His Majesty the King in the right of Canada, as represented by the Minister of Mines and Resources No Drawing. Application September 10, 1942, Serial No. 457,876. In Canada September 4, 1942

5 Claims. (Cl. 44—1)

This invention relates to coal and the like which on combustion produces a clinkering ash residue, and is particularly directed to the treatment of such fuels to render them capable of providing an ash residue which will form into a desirable clinker when the fuel is burned.

Buckwheat sizes of certain European and Asiatic coals have been extensively used in blower-operated household furnaces with fixed grates. For example, Welsh anthracite coal has proven satisfactory for this purpose because its ash residue forms into a clinker of the desired type. It has been found that a coal suitable for use in domestic heating plants equipped with blowers and fixed grates should have the following characteristics:

(a) The ash must be of such a quality that its fusion or softening temperature is low enough to permit, under forced draft conditions, the formation of a clinker which is sufficiently strong to allow its removal through the fire door of the furnace.

(b) The clinker should be tough and compact yet porous enough to allow the passage of air through it to the live fuel.

(c) The quantity of ash in the coal should be low so that the resulting clinker is not bulky in comparison to the amount of coal fired, thus obviating the necessity of clinker removal from the furnace at too frequent intervals.

(d) The fuel should be non-caking, or only very weakly caking, to produce a fuel bed which requires the minimum amount of attention between firing periods.

(e) The calorific value of the coal should be relatively high, making it unnecessary to fire so large an amount of coal at one time that the fire would be smothered and possibly result in a dangerous explosion, and (f) The carry-over of fly-ash and soot onto the heating surfaces of the furnace and flues should be very small, thus necessitating only an occasional cleaning.

Attempts have been made by blending and the like of other coals to make them suitable for this purpose but without success. Those high rank, low volatile bituminous and anthracite coals of Canadian and United States origin which are satisfactory in so far as general burning characteristics are concerned are unsuitable because of their non-clinkering ash.

The object of the present invention is to provide a method whereby available low volatile bituminous and anthracite coals may be treated to insure the provision of an ash residue which will form a clinker with the necessary characteristics as described.

A more specific object of the invention is to provide an economical and effective method for treating such coal to modify its normal ash content, within well controlled limits, to insure, upon burning, the formation of a clinker, which is sufficiently porous to allow passage through it of air to the live fuel, which at operating temperatures does not become fluid or adhere to or block the air passages in the grate, and which is tough and compact to permit easy removal through the furnace charging door.

The mineral or ash producing matter in coal is composed mainly of compounds of silica, alumina, lime and iron with smaller quantities of magnesia, titanium and alkali compounds. It is known that generally a coal ash residue containing a large amount of silica and alumina as compared to the amount of the bases or fluxing agents, such as lime and iron oxide, have a high softening temperature, whereas those containing relatively low amounts of silica and alumina have low softening temperatures. Workers in investigations on coal have studied coal ash on the basis of a four components system, i. e.,

$$SiO_2 - Al_2O_3 - Fe_2O_3 - CaO$$

and have established a correlation between the softening temperature and the ash analysis. While the softening temperature of a coal ash is a factor in the formation of clinker, it does not in itself afford a control which enables one to produce a coal which in combustion yields the type of clinker essential to the efficient use of the coal in blower-operated furnaces. Heretofore no method has been available for rendering a non-clinkering coal suitable for this purpose.

After much investigation at the fuel research laboratories of the Canadian Department of Mines and Resources applicant has found that naturally occurring non- or poorly-clinkering coals having relatively high ash fusibility may be economically treated to render them well adapted for use in blower-operated furnaces. As illustrative of the type of coal to which the method of the present invention is particularly applicable an average ash analysis, on the four component bases, of United States anthracites and certain Canadian coals, such as those mined in the Cascade area of Alberta, are given as follows:

|  | Cascade area Alberta coal | Pennsylvania anthracite white ash |
|---|---|---|
| $SiO_2$ per cent | 60.1 | 54.6 |
| $Al_2O_3$ do | 30.5 | 36.7 |
| $Fe_2O_3$ do | 7.8 | 7.8 |
| $CaO$ do | 1.6 | 0.9 |
| Softening temp. of ash ° F | 2850+ | 2850+ |

The ash of these coals is higher in silica and alumina and lower in iron oxide than the ash of either Welsh or Indo-China anthracites, which, as previously indicated, have very satisfactory clinkering properties. Investigation has shown that an ash which results in the formation of the most suitable type of clinker has a silica-alumina to iron oxide ratio varying between 4.0 and 6.0 providing the lime content is not substantially over 6% on the four component basis.

The present invention contemplates the step of treating coals having a non-clinkering ash of high fusibility, with a silica-alumina to iron oxide ratio value greater than approximately 6 and a lime content below substantially 6%, by adding a compound thereto to decrease such ratio value to a point between substantially 4 to 6, inclusive, whereby the ash of the treated coal will have lower fusibility and satisfactory clinkering qualities. A suitable manner of accomplishing this step is to increase the iron oxide content of the ash by the addition to the coal of compounds rich in iron such as various types of iron ore, for instance, magnetite, hematite and the like, or boiler scale or other material providing a source of iron.

The compound or compounds employed should be intimately and uniformly mixed with the coal to be treated and for this purpose, and in order that the relatively small quantity required shall be available in such a form that it will react readily with the ash resulting from the combustion of the coal, it is necessary that the compound be in a fine state of division, preferably of an 80-mesh screen size.

Since only a small quantity of added compound is required in comparison with the amount of coal to be treated thereby, and since it is preferably employed in the very fine state referred to, loss of appreciable quantities thereof, due to its filtering through the coarser particles of coal during handling of the latter, may occur, unless steps are taken to prevent such loss. It is therefore proposed that the coal particles be coated with an agent to maintain the surfaces thereof in a more or less permanently "wet" condition whereby the fine chemical compound "dust" will adhere thereto. Suitable agents for this purpose which are non-volatile at normal temperatures are oil and calcium chloride solution. Many coals are now treated, either at the mine or by distributors, with oil to reduce dust during handling, an apparatus for conveying the coal in a thin stream through an oil spray or bath being utilized for the purpose. So-treated coal presents very satisfactory surfaces for adherence of the chemical compound powder.

The coal may be conveniently treated at the mine, by the wholesaler or by the retailer. Where a dustproofing apparatus is already in use, the addition of a dispenser thereto for sprinkling the chemical compound powder onto the thin stream of coated coal particles may be readily accomplished.

The following example is illustrative of the method and results:

|  | "Blower" size coal | |
|---|---|---|
|  | As received | Treated with iron oxide |
| Quantity of iron ore used in treatment, lbs. per ton |  | 15. |
| Ash: |  |  |
| By analysis per cent | 4.7 | 5.3. |
| As refuse do | 6.3 | 6.6. |
| Fusibility of ash: |  |  |
| Initial deformation temp ° F | 2850+ | 2500. |
| Softening temp do | 2850+ | 2620. |
| Fluid temperature ° F | 2850+ | 2740. |
| Clinkering characteristics | Non-clinkering | Good. Tough, porous and similar to Welsh clinker in all its characteristics. |

I claim:

1. Method of treating coal having a substantially non-clinkering ash at approximately 2800° F. to render said ash clinkering below said temperature which comprises determining the ratio value of silica plus alumina to iron oxide content of said ash, and intimately mixing with said coal a controlled quantity of an iron oxide containing material to lower said ratio value to at most 6.

2. Method of treating coal having a substantially non-clinkering ash at approximately 2800° F. to render said ash clinkering below said temperature which comprises determining the ratio value of silica plus alumina to iron oxide content of said ash, and adding an iron oxide containing material to said coal in such quantity that said ratio value is below 6.

3. Method of treating coal having a substantially non-clinkering ash at approximately 2800° F. to render said ash clinkering below said temperature which comprises determining the ratio value of silica plus alumina to iron oxide content of said ash, coating said coal with a composition which is non-volatile at normal temperatures to provide a dust-adhering surface thereon, and intimately and uniformly mixing with said coal a controlled quantity of an iron oxide containing material to lower said ratio value to at most 6, said compound being in finely divided dust form whereby it adheres to said surface.

4. A method of treating coal having a substantially non-clinkering ash at approximately 2800° F. to render said ash clinkering below said temperature, which comprises intimately and uniformly mixing with said coal containing not substantially more than 6% of lime a controlled quantity of a finely divided iron oxide containing material to give it an ash content wherein the ratio of silica plus alumina to iron oxide plus lime is not more than 6 nor less than 4.

5. A method as defined in claim 4 wherein the coal particles are coated with a wetting agent to cause said finely divided compound to adhere thereto.

EDWARD SWARTZMAN.